US011106666B2

(12) United States Patent
Weyerhaeuser et al.

(10) Patent No.: US 11,106,666 B2
(45) Date of Patent: Aug. 31, 2021

(54) INTEGRATED EXECUTION OF RELATIONAL AND NON-RELATIONAL CALCULATION MODELS BY A DATABASE SYSTEM

(71) Applicant: SAP SE, Walldorf (DE)

(72) Inventors: Christoph Weyerhaeuser, Heidelberg (DE); Tobias Mindnich, Sulzbach (DE); Johannes Merx, Heidelberg (DE); Julian Schwing, Mannheim (DE)

(73) Assignee: SAP SE, Walldorf (DE)

( * ) Notice: Subject to any disclaimer, the term of this patent is extended or adjusted under 35 U.S.C. 154(b) by 1099 days.

(21) Appl. No.: 14/723,627

(22) Filed: May 28, 2015

(65) Prior Publication Data
US 2016/0350368 A1 Dec. 1, 2016

(51) Int. Cl.
*G06F 16/00* (2019.01)
*G06F 16/2453* (2019.01)
*G06F 16/25* (2019.01)

(52) U.S. Cl.
CPC .......... *G06F 16/2453* (2019.01); *G06F 16/25* (2019.01)

(58) Field of Classification Search
None
See application file for complete search history.

(56) References Cited

U.S. PATENT DOCUMENTS

| 8,195,643 B2 * | 6/2012 | Weyerhaeuser .. G06F 16/24547 707/713 |
| 9,146,979 B2 * | 9/2015 | Weyerhaeuser .. G06F 17/30498 |
| 2012/0173530 A1 * | 7/2012 | Kurciska .............. G08G 1/0112 707/738 |
| 2016/0140175 A1 * | 5/2016 | Weyerhaeuser .. G06F 16/24542 707/718 |

* cited by examiner

*Primary Examiner* — Anhtai V Tran
(74) *Attorney, Agent, or Firm* — Mintz Levin Cohn Ferris Glovsky and Popeo, P.C.

(57) ABSTRACT

A query that requests a filter attribute is received by a database server from a remote application server that is associated with at least one calculation scenario that includes calculation nodes having relational operators and calculation nodes having non-relational operators. The calculation nodes having relational or non-relational operators are optimized by a calculation engine model optimizer and the calculation nodes having relational operators are further optimized by a relational database optimizer. Thereafter, the operations defined by the optimized calculation nodes can be executed to result in a responsive data set. Next, the data set is provided to the application server by the database server.

21 Claims, 6 Drawing Sheets

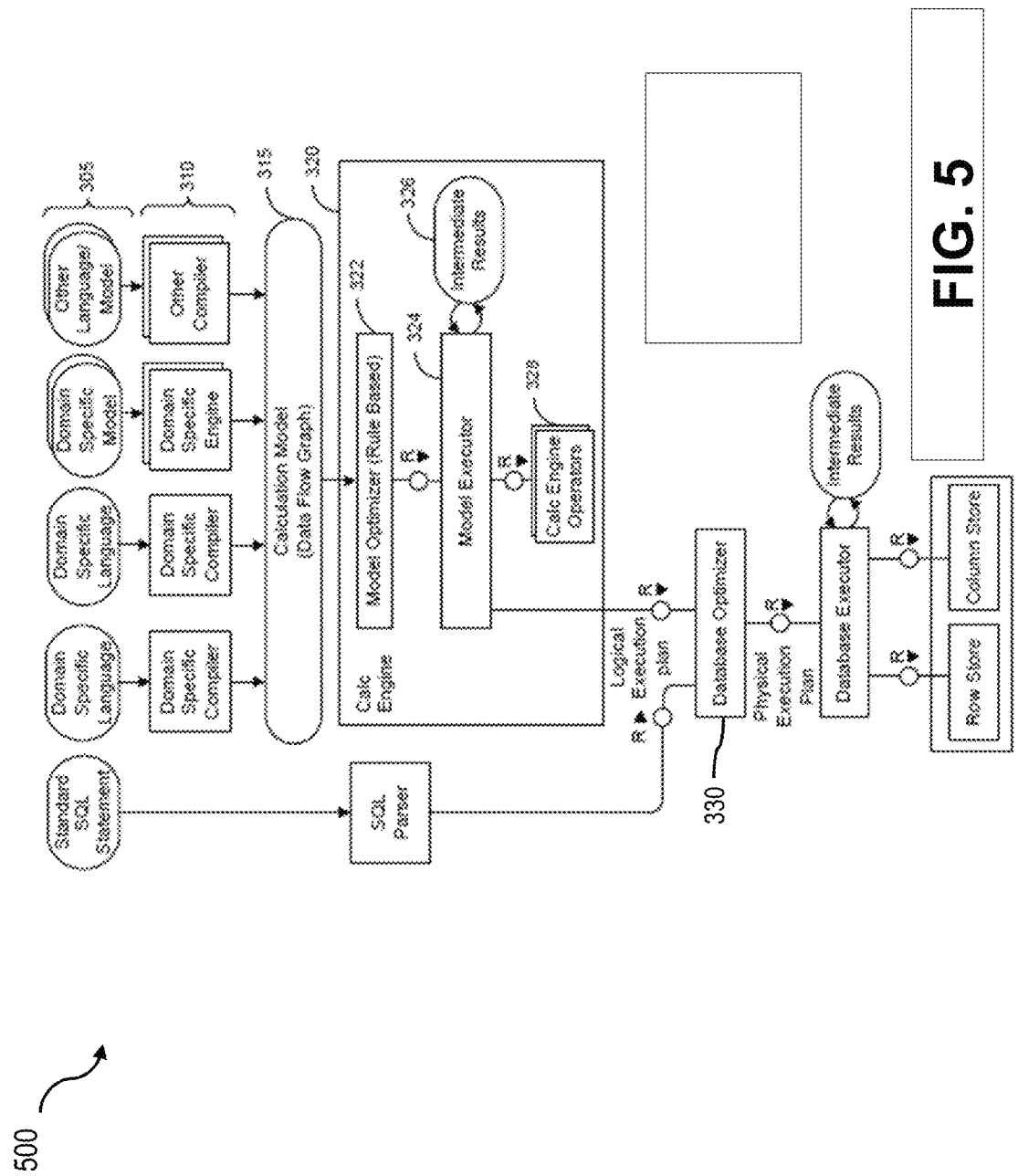

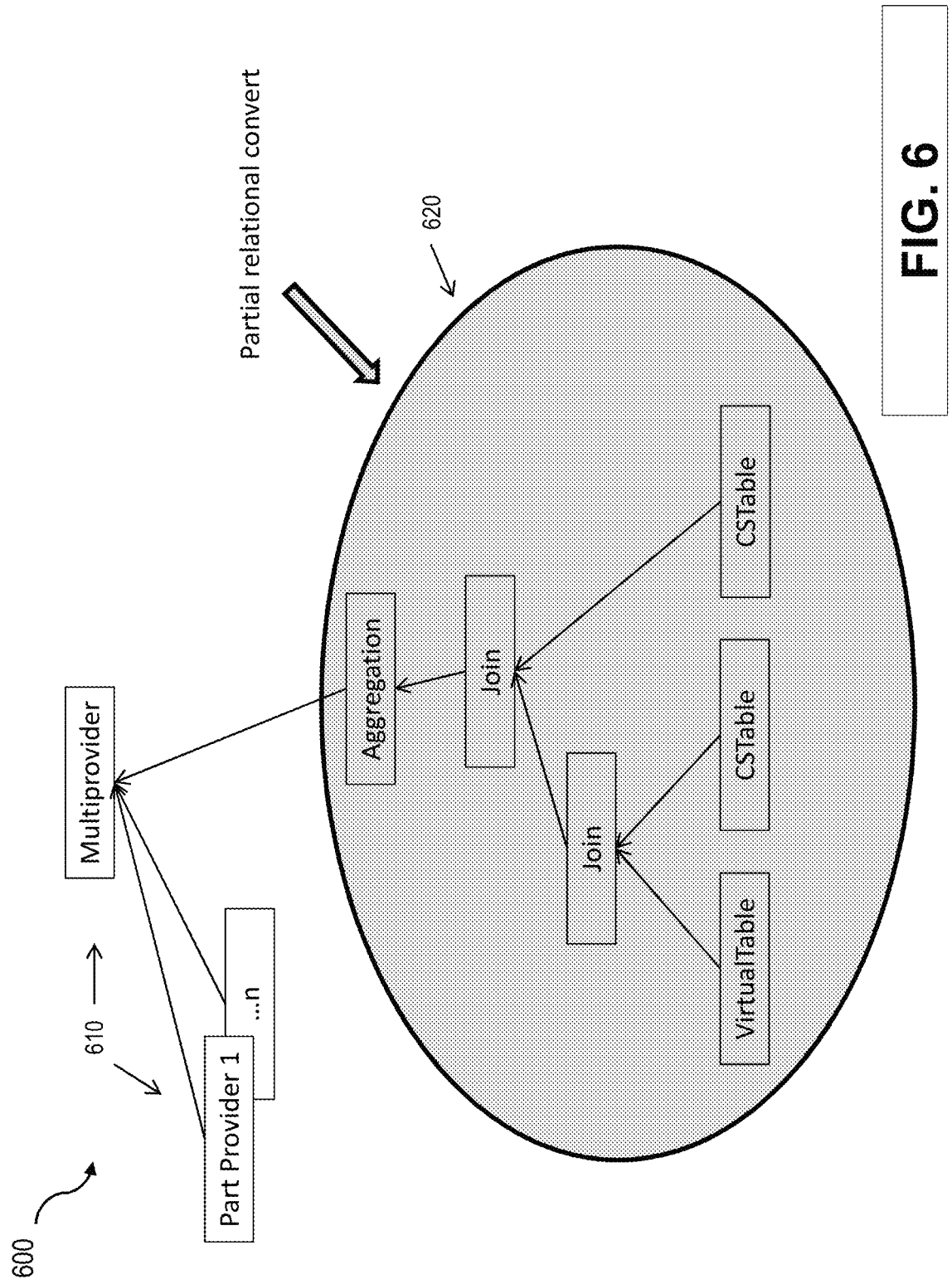

US 11,106,666 B2

INTEGRATED EXECUTION OF RELATIONAL AND NON-RELATIONAL CALCULATION MODELS BY A DATABASE SYSTEM

TECHNICAL FIELD

The subject matter described herein relates to a database system that optimizes calculation nodes forming part of at least one calculation scenario with at least one relational operation and one non-relational operator.

BACKGROUND

Data flow between an application server and a database server is largely dependent on the scope and number of queries generated by the application server. Complex calculations can involve numerous queries of the database server which in turn can consume significant resources in connection with data transport as well as application server-side processing of transported data. Calculation engines can sometimes be employed by applications and/or domain specific languages in order to effect such calculations. Such calculation engines can execute calculation models/scenarios that comprise a plurality of hierarchical calculation nodes.

With some business warehouse architectures, customers combine data from several data sources some of which may be relational and some of which may be non-relational. For example, some architectures utilize virtual tables for reporting purposes which means the underlying data source is another database system which can be physical located in a remote data center. However, such an arrangement can be disadvantageous because data transfer between different databases can be highly expensive and often incurs large latencies compared to data transfers inside the same database. Thus, the amount of data to-be-transferred from remote data sources should be reduced as far as possible.

SUMMARY

The current subject matter provides the possibility to combine several specialized optimizer and integrate non-relational operators and relational operators within a single optimized calculation scenario. This arrangement is made possible by either stacking non-relational calculation scenarios on top of relational calculation scenarios or mixing both kinds of operators within a single calculation scenario.

In one aspect, a query is received by a database server from a remote application server. The query is associated with a first calculation scenario and a second calculation scenario that each define a data flow model that includes one or more calculation nodes arranged in a hierarchy. The first calculation scenario includes calculation nodes performing operations on non-relational data and the second calculation scenario include calculation nodes performing operations on relational data. The database server then instantiates and optimizes the first and the second calculation scenario. The optimizing of the first and the second calculation scenario uses a calculation engine model optimizer. Subsequent to the instantiating, the second calculation scenario is optimized using a relational database optimizer. Next, the database server executes the operations defined by the calculation nodes of both of the optimized first calculation scenario and the optimized second calculation scenario to result in a responsive data set. The data set can then be provided by the database server to the application server.

The second calculation scenario can be nested within the first calculation scenario.

The second calculation scenario can include a tag or associated metadata identifying the second calculation scenario as comprising calculation nodes performing operations on relational data.

In some variations, each calculation node performing relational operations can be added to a container prior to optimization by the relational database optimizer.

At least a portion of paths and/or attributes defined by the calculation scenario can, in some implementations, not be required to respond to the query. In such cases, the instantiated calculation scenario can omit the paths and attributes defined by the calculation scenario that are not required to respond to the query.

At least one of the calculation nodes can filter results obtained from the database server. At least one of the calculation nodes can sort results obtained from the database server.

The calculation scenario can be instantiated in a calculation engine layer by a calculation engine. The calculation engine layer can interact with a physical table pool and a logical layer. The physical table pool can include physical tables containing data to be queried, and the logical layer can define a logical metamodel joining at least a portion of the physical tables in the physical table pool. The calculation engine can invoke an SQL processor for executing set operations.

An input for each calculation node can include one or more of: a physical index, a join index, an OLAP index, and another calculation node. Some or all calculation nodes can have at least one output table that is used to generate the data set. At least one calculation node can consume an output table of another calculation node.

The query can be forwarded to a calculation node in the calculation scenario that is identified as a default node if the query does not specify a calculation node at which the query should be executed. The calculation scenario can include database metadata.

In an interrelated aspect, a database server receives a query from a remote application server. The query is associated with a calculation scenario that defines a data flow model that includes calculation nodes arranged in a hierarchy. A first subset of the calculation nodes performs operations on non-relational data and a second, different subset of the calculation nodes performing operations on relational data. A calculation engine of the database server then instantiates the calculation nodes and a calculation model optimizer optimizes the calculation nodes. Subsequent to the instantiating, a subset of the calculation nodes is optimized using a relational database optimizer. Next, the database server can then execute the operations defined by the calculation nodes optimized by both the calculation engine model optimizer and the relational database optimizer to result in a responsive data set (which can be subsequently provided to the application server).

In still a further interrelated aspect, a database server receives a query from a remote application server that is associated with a first calculation scenario, a second calculation scenario, and a third calculation scenario that each define a data flow model that includes one or more calculation nodes arranged in a hierarchy. The first calculation scenario and second calculation scenario each comprise calculation nodes performing operations on non-relational data and the third calculation scenario comprising calculation nodes performing operations on relational data. The database server then instantiates and optimizes the first calculation scenario and the second calculation scenario and a third calculation scenario. The optimizing comprises merging the first calculation scenario with the second calculation scenario and subsequently optimizing the merged first calculation scenario and second calculation scenario and the third calculation scenario using a calculation engine model optimizer. Subsequent to the instantiating, the third calculation scenario is optimized using a relational database optimizer. The database server then executes the operations defined by the calculation nodes of both of the optimized merged first and second calculation scenarios and the optimized third calculation scenario to result in a responsive data set. The data set can later be provided by the database server to the application server.

Computer program products are also described that comprise non-transitory computer readable media storing instructions, which when executed one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, the current subject matter is advantageous in that it allows for the use of non-relational operators that can be optimized by a calculation engine model optimizer together with relational operators that are best optimized by a relational optimizer in order to gain a maximum performance. The usage of two optimizers is possible even if relational and non-relational operators are part of two calculation scenarios whereas one consumes the other and both are merged into a single calculation Scenario.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 5 is a diagram illustrating an architecture for processing and execution control; and FIG. 6 is a diagram illustrating a calculation scenario in which certain calculation nodes having relational operators are added to a container.

DETAILED DESCRIPTION

The current subject matter provides methods, systems, and computer program products to enable the possibility to use non-relational operators such as multiproviders which rely on a calculation engine optimizer for optimization together with relational operators that are best optimized by a relational optimizer. With the current subject matter, it is possible to benefit from two specialized optimizers to gain a maximum performance even when both relational and non-relational operators form part of two (or more) calculation scenarios that have a relationship in which one calculation scenario consumes the other calculation scenario and both (or all) are merged into a single calculation scenario. The current subject matter also enables the ability to have just one (already merged) calculation scenario so that parts of the scenario are treated in a non-relational manner and the other parts are treated relational manner.

Figure 1:
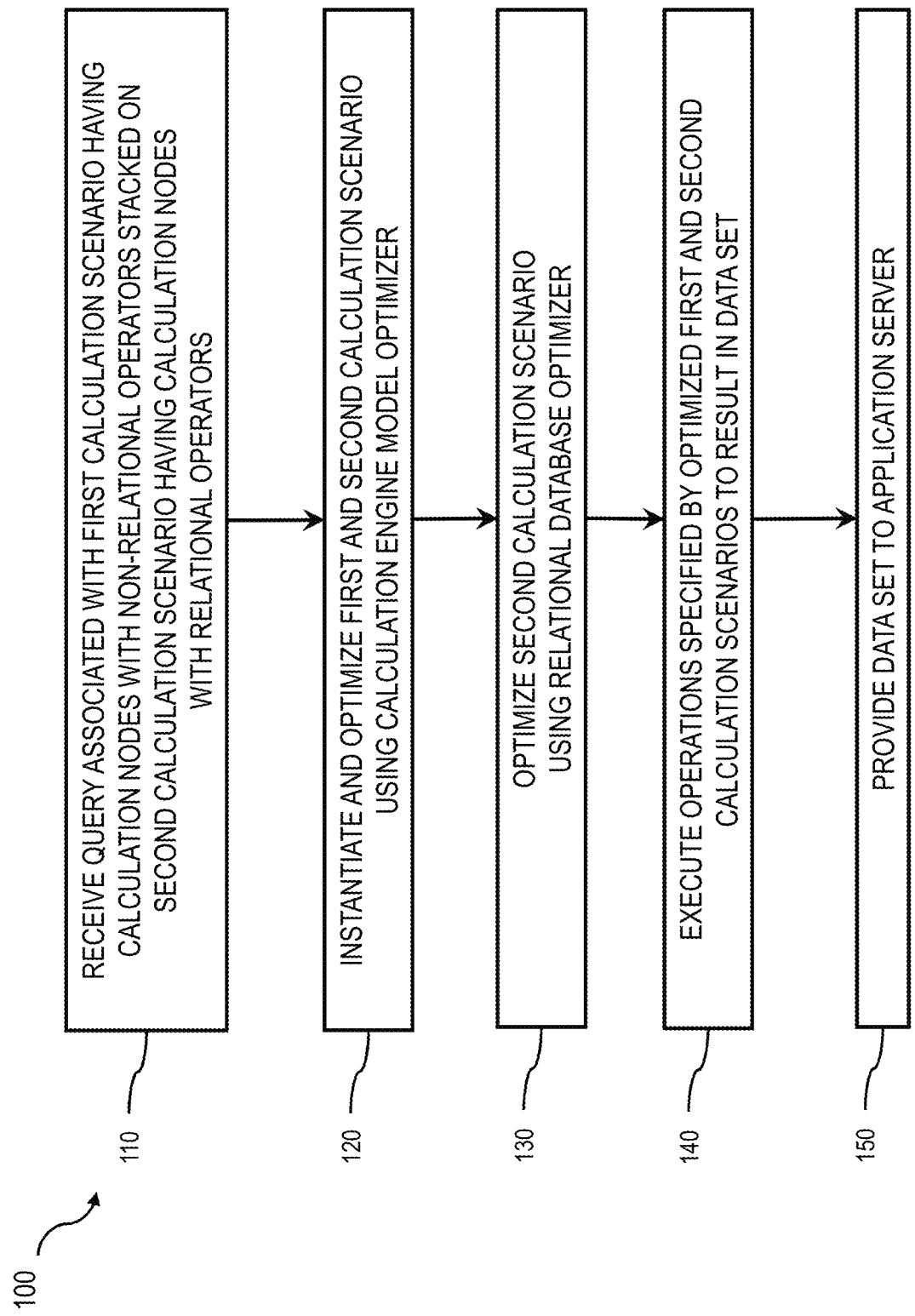
FIG. 1 is a process flow diagram illustrating execution of a first calculation scenario having calculation nodes with non-relational operators stacked on a second calculation scenario having calculation nodes with relational operators.

FIG. 1 is a diagram 100 in which, at 110, a query is received by a database server from a remote application server that is associated with a first calculation scenario stacked on a second calculation scenario that each define a data flow model that includes one or more calculation nodes arranged in a hierarchy. The first calculation scenario comprises calculation nodes performing operations on non-relational data and the second calculation scenario comprises calculation nodes performing operations on relational data. Thereafter, at 120, the database server instantiates the first and the second calculation scenario and optimizes the first and the second calculation scenario using a calculation engine model optimizer. Subsequent to the instantiating and optimizing, at 130, the second calculation scenario is further optimized using a relational database optimizer. Next, at 140, the database server executes the operations defined by the calculation nodes of both of the optimized first calculation scenario and the optimized second calculation scenario to result in a responsive data set. The database server then provides the data set to the application server.

Figure 2:
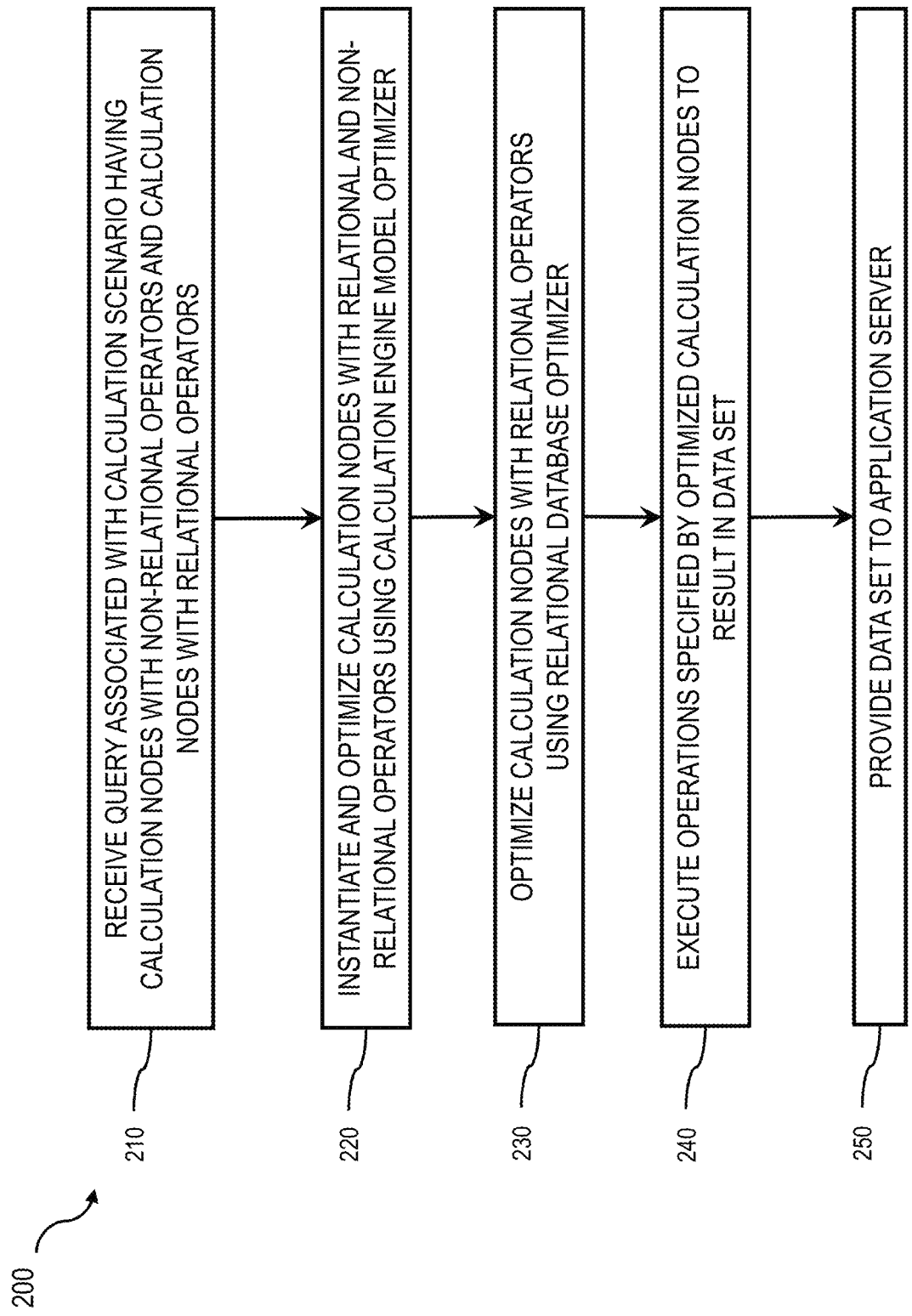
FIG. 2 is a process flow diagram illustrating execution of a calculation scenario having calculation nodes with non-relational operators and calculation nodes with relational operators.

FIG. 2 is a diagram 200 in which, at 210, a query is received by a database server from a remote application server. The query is associated with a calculation scenario that defines a data flow model that includes calculation nodes arranged in a hierarchy. A first subset of the calculation nodes performs operations on non-relational data and a second, different subset of the calculation nodes performs operations on relational data. Thereafter, at 220, the database server instantiates the calculation scenario and optimizes the both subsets of the calculation nodes using a calculation engine model optimizer. In addition, at 230, subsequent to the instantiating, the second subset of the calculation nodes is further optimized using a relational database optimizer. Next, at 240, the database server executes the operations defined by the calculation nodes optimized by both the calculation engine model optimizer and the relational database optimizer to result in a responsive data set. The database server then, at 250, provides the data set to the application server.

Figure 3:
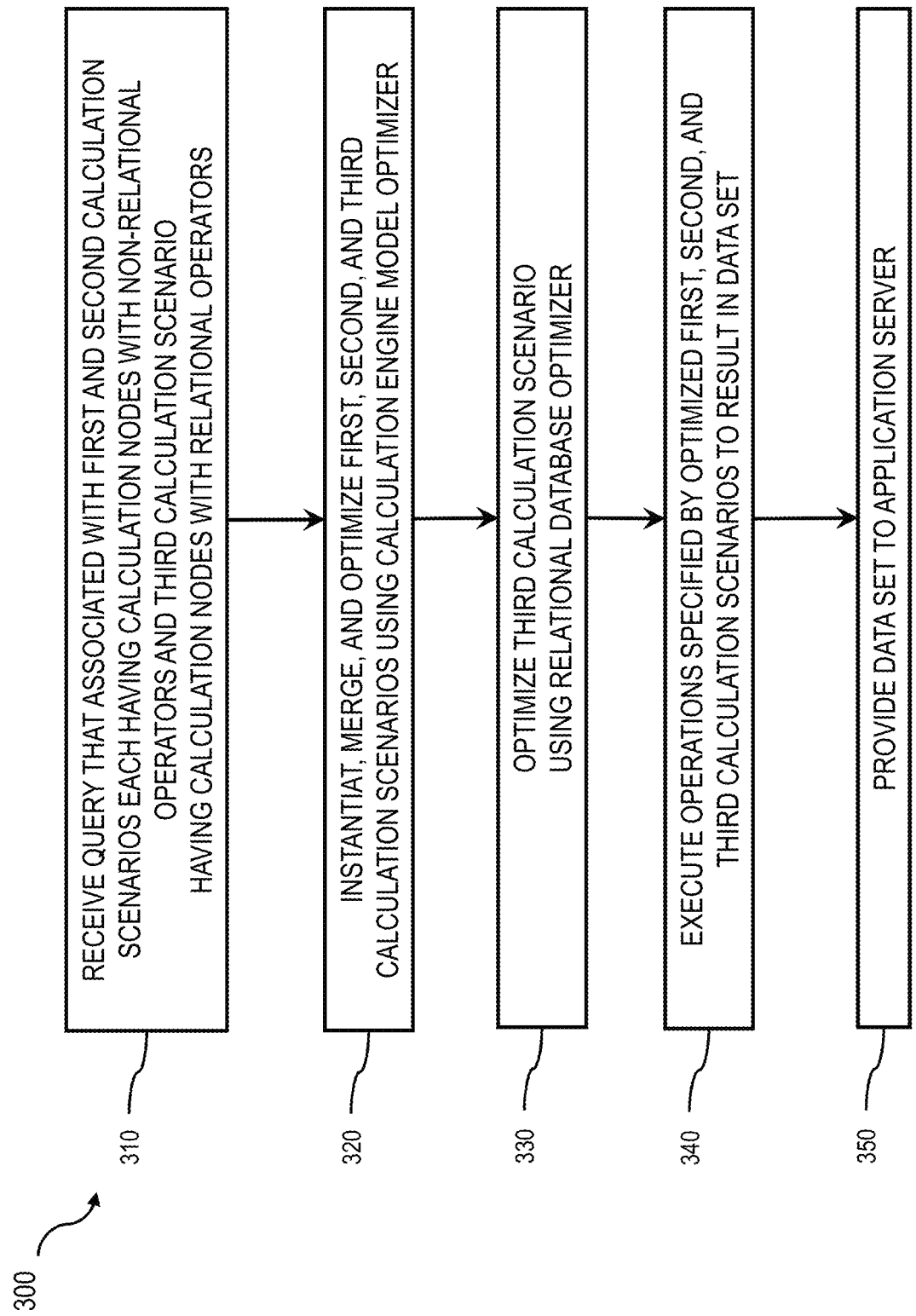
FIG. 3 is a process flow diagram illustrating execution of first and second calculation scenarios having calculation nodes with non-relational operators stacked on a third calculation scenario having calculation nodes with relational operators.

FIG. 3 is a diagram 300 in which, at 310, a database server receives a query from a remote application server. The query is associated with a first calculation scenario, a second calculation scenario, and a third calculation scenario that each define a data flow model that includes one or more calculation nodes arranged in a hierarchy. The first calculation scenario and the second calculation scenario each comprise calculation nodes performing operations on non-relational data and the third calculation scenario comprises calculation nodes performing operations on relational data. Later, at 320, the database server instantiates and optimizes the first calculation scenario, the second calculation scenario and the third calculation scenario. The optimizing includes merging the first calculation scenario with the second calculation scenario and subsequently optimizing the merged first calculation scenario and second calculation scenario using a calculation engine model optimizer. Also the third calculation scenario is optimized using a calculation engine model optimizer. In addition, at 330, the third calculation scenario is optimized using a relational database optimizer. The database server then, at 340, executes the operations defined by the calculation nodes of both of the optimized merged first and second calculation scenarios and the optimized third calculation scenario to result in a responsive data set. Later, at 350, the database server provides the data set to the application server.

Figure 4:
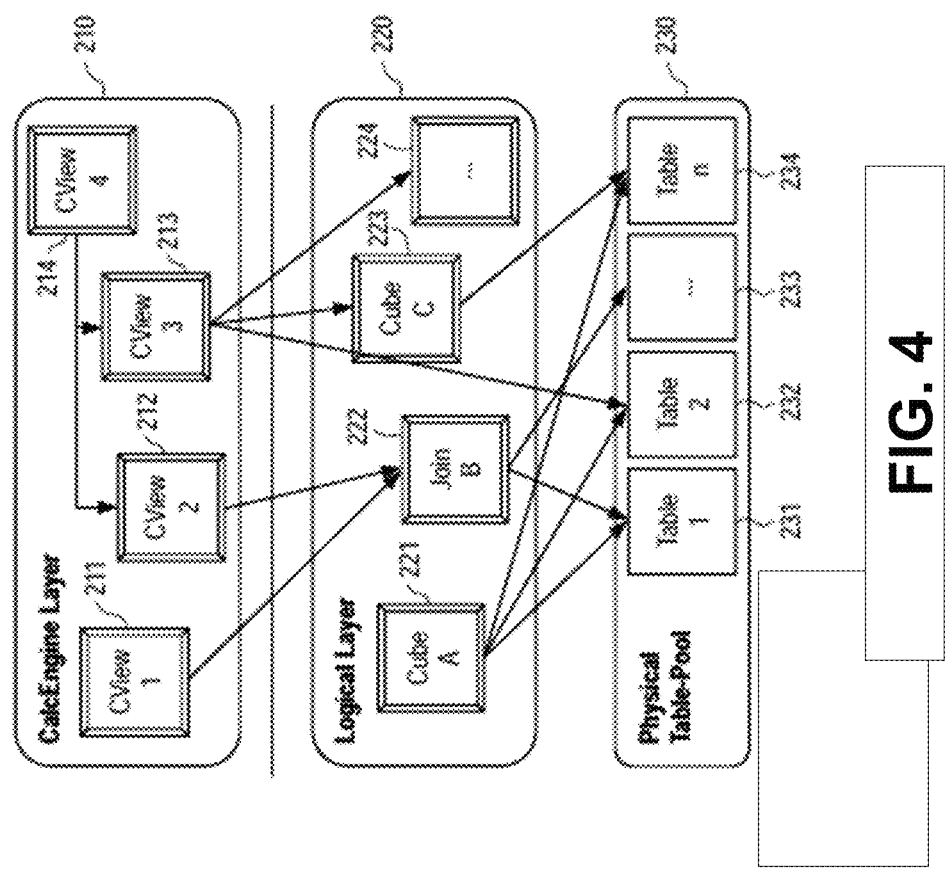
FIG. 4 is a diagram illustrating a calculation engine layer, a logical layer, a physical table pool and their interrelationship.

FIG. 4 is a diagram 400 that illustrates a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical metamodels defined by the logical layer 220 to form a new index. For example, the tables in a cube (OLAP view) can be assigned roles (e.g., fact or dimension tables) and joined to form a star schema. It is also possible to form join indexes, which can act like database view in environments such as the Fast Search Infrastructure (FSI) by SAP SE.

As stated above, calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP views or calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

In calculation scenarios, two different representations can be provided. First, a stored ("pure") calculation scenario in which all possible attributes are given. Second, an instantiated/executed model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario. For on-the-fly scenarios this means that the same calculation scenario (e.g., in XML format, etc.) can be used for different queries and sent with the actual query. The benefit is that on application server side the XML description of a calculation scenario can be used for several queries and thus not for each possible query one XML has to be stored.

Further details regarding calculation engine architecture and calculation scenarios can be found in U.S. Pat. No. 8,195,643, the contents of which are hereby fully incorporated by reference.

FIG. 5 is a diagram 500 illustrating a sample architecture for request processing and execution control. As shown in FIG. 5, artifacts 305 in different domain specific languages can be translated by their specific compilers 310 into a common representation called a "calculation scenario" 315 (illustrated as a calculation model). To achieve enhanced performance, the models and programs written in these languages are executed inside the database server. This arrangement eliminates the need to transfer large amounts of data between the database server and the client application. Once the different artifacts 305 are compiled into this calculation scenario 315, they can be processed and executed in the same manner. The execution of the calculation scenarios 315 is the task of a calculation engine 320.

The calculation scenario 315 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 315 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 315 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data.

Calculation scenarios 315 are more powerful than traditional SQL queries or SQL views for many reasons. One reason is the possibility to define parameterized calculation schemas that are specialized when the actual query is issued. Unlike a SQL view, a calculation scenario 315 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 315 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 315. This instantiated calculation scenario 315 is optimized for the actual query and does not contain attributes, nodes or data flows that are not needed for the specific invocation.

When the calculation engine 320 gets a request to execute a calculation scenario 315, it can first optimize the calculation scenario 315 using a rule based model optimizer 322. Examples for optimizations performed by the model optimizer can include "pushing down" filters and projections so that intermediate results 326 are narrowed down earlier, or the combination of multiple aggregation and join operations into one node. The optimized model can then be executed by a calculation engine model executor 324 (a similar or the same model executor can be used by the database directly in some cases). This includes decisions about parallel execution of operations in the calculation scenario 315. The model executor 324 can invoke the required operators (using, for example, a calculation engine operators module 328) and manage intermediate results. Most of the operators are executed directly in the calculation engine 320 (e.g., creating the union of several intermediate results). The remaining nodes of the calculation scenario 315 (not implemented in the calculation engine 320) can be transformed by the model executor 324 into a set of logical database execution plans. Multiple set operation nodes can be combined into one logical database execution plan if possible.

The model optimizer 322 can be configured to enable dynamic partitioning based on one or more aspects of a query and/or datasets used by queries. The model optimizer can implement a series of rules that are triggered based on attributes of incoming datasets exceeding specified thresholds. Such rules can, for example, apply thresholds each with a corresponding a parallelization factor. For example, if the incoming dataset has 1 million rows then two partitions (e.g., parallel jobs, etc.) can be implemented, or if the incoming dataset has five million rows then five partitions (e.g., parallel jobs, etc.) can be implemented, and the like. The attributes of the incoming datasets utilized by the rules of model optimizer 322 can additionally or alternatively be based on an estimated and/or actual amount of memory consumed by the dataset, a number of rows and/or columns in the dataset, and the number of cell values for the dataset, and the like.

The calculation engine 320 typically does not behave in a relational manner. The main reason for this is the instantiation process. The instantiation process can transform a stored calculation model 315 to an executed calculation model 315 based on a query on top of a calculation view which is a (catalog) column view referencing one specific node of a stored calculation model 315. Therefore, the instantiation process can combine the query and the stored calculation model and build the executed calculation model.

The main difference between a relational view or SQL with subselects and a calculation model is that the projection list in a relational view is stable also if another SQL statement is stacked on top whereas in a calculation model the projection list of each calculation node in the calculation model is depending on the projection list of the query or the parent calculation node(s).

With a calculation model 315, a user can provide a set of attributes/columns on each calculation node that can be used by the next calculation node or the query. If attributes/columns are projected in a query or on the parent calculation node, then just a subset of these requested attributes/columns can be considered in the executed calculation model.

The calculation engine 320 can offer model designers the possibility to enrich their data model with a forced filter pushdown semantic which can be seen as a generic and flexible way to express a filter injection. In contrast to simply allowing a user to specify a filter condition on a specific node level, the current subject matter is directed to a forced filter pushdown feature. With a forced filter pushdown feature, if attributes are flagged for forced pushdown in a query, the calculation engine 320 can ensure that all attributes are removed on the defined data flow graph (as part of the instantiation process). In some variations, a runtime error can be indicated if attributes are still required on the defined data flow path. With such functionality, users can easily access the logic in normal SQL WHERE conditions and, in some cases, specifically request such attributes.

In some variations, the calculation scenarios can be stacked (i.e., one calculation scenario is nested within another calculation scenario and/or an output of one calculation scenario is consumed by another calculation scenario, etc.). During instantiation in the calculation engine 320, stacked calculation scenarios (i.e., a calculation scenario consumes 1 to N other calculation scenarios) are typically merged into a single calculation scenario.

To address problems of utilizing several different optimizers, such a merge can be extended as follows. Each calculation scenario that should be optimized as relational can get an indicator "partial_convert". If this calculation scenario is consumed by another non-relational calculation scenario (usually all standard calculation scenarios are non-relational) during instantiation, the corresponding calculation nodes from the relational calculation scenario can be marked as part of a relational calculation scenario. During optimization the complete calculation scenario can be first optimized by the non-relational optimizer (i.e. the calculation engine model optimizer 322). These non-relational optimizations by the calculation engine model optimizer 322 do not affect the relational parts of the model.

Subsequently, the previously marked relational nodes can be converted into a structure on which the relational optimizer 330 can perform its optimizations. Therefore, each connected subcomponent can be added to a container (an example container is shown in diagram 600 of FIG. 6). Thus, the resulting graph is only non-relational but reduced since the relational parts are part of the containers. During execution of the calculation scenario these relational parts in those containers are further optimized by the relational optimizer 330 (e.g., a SQL optimizer). Therefore, the relational optimizer 330 can receive only a sub-part of the entire calculation scenario (only the relational nodes) for optimization. Hence the relational optimizer does not require knowledge about the non-relational operators and cannot influence the already optimized non-relational parts. Therefore the non-relational part can contain operators which are not expressable in standard SQL.

With reference to diagram 600 of FIG. 6, in some cases, there a single calculation scenario can have nodes 610 that can be optimized, on one hand, by the calculation engine model optimizer 322 and also have nodes 620 that can be optimized, on the other hand, by the relational optimizer 330. With such cases, the calculation model 315 can selectively mark the nodes 620 that are to be additionally optimized by the relational optimizer 330 (the converse is also possible in that all nodes to be optimized by the calculation engine model optimizer 322 are marked).

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
receiving, by a database server from a remote application server, a query that is associated with a first calculation scenario and a second calculation scenario that each define a data flow model that includes one or more calculation nodes arranged in a hierarchy, the first calculation scenario comprising non-relational calculation nodes performing operations on non-relational data and the second calculation scenario comprising relational calculation nodes performing operations on relational data;
merging, by the database server, the first calculation scenario and the second calculation scenario into a complete calculation scenario while maintaining a format of the non-relational calculation nodes, the complete calculation scenario comprising the non-relational calculation nodes and the relational calculation nodes;
optimizing, by a calculation engine model optimizer, the non-relational calculation nodes included in the complete calculation scenario;
optimizing, by a relational database optimizer, the relational calculation nodes included in the complete calculation scenario, the relational database optimizer identifying the relational calculation nodes based at least on an indicator associated with each of the relational calculation nodes;
executing, by the database server, the operations defined by the relational calculation nodes and the non-relational calculation nodes of the complete calculation scenario to result in a responsive data set; and
providing, by the database server to the application server, the data set.

2. The method of claim 1, wherein the second calculation scenario is nested within the first calculation scenario.

3. The method of claim 1 further comprising: adding each relational calculation node to a container prior to optimization by the relational database optimizer.

4. The method of claim 1, wherein at least a portion of paths and/or attributes defined by the calculation scenario are not required to respond to the query, and wherein the instantiated calculation scenario omits the paths and attributes defined by the calculation scenario that are not required to respond to the query.

5. The method of claim 1, wherein at least one of the calculation nodes filters results obtained from the database server.

6. The method of claim 1, wherein at least one of the calculation nodes sorts results obtained from the database server.

7. The method of claim 1, wherein the executing comprises:
forwarding the query to a calculation node in the calculation scenario that is identified as a default node if the query does not specify a calculation node at which the query should be executed.

8. The method of claim 1, wherein the calculation scenario comprises database metadata.

9. The method of claim 1, further comprising marking, by the database server, each of the relational calculation nodes with the indicator.

10. The method of claim 1, further comprising connecting, by the database server, the relational calculation nodes to a graph structure.

11. The method of claim 1, wherein the calculation scenario is instantiated in a calculation engine layer by a calculation engine.

12. The method of claim 1, wherein an input for each calculation node comprises one or more of: a physical index, a join index, an OLAP index, and another calculation node.

13. The method of claim 12, wherein each calculation node has at least one output table that is used to generate the data set.

14. The method of claim 13, wherein at least one calculation node consumes an output table of another calculation node.

15. The method of claim 11, wherein the calculation engine layer interacts with a physical table pool and a logical layer, the physical table pool comprising physical tables containing data to be queried, and the logical layer defining a logical metamodel joining at least a portion of the physical tables in the physical table pool.

16. The method of claim 15, wherein the calculation engine invokes an SQL processor for executing set operations.

17. A method comprising:
receiving, by a database server from a remote application server, a query that is associated with a calculation scenario that defines a data flow model that includes calculation nodes arranged in a hierarchy, a first subset of the calculation nodes performing operations on non-relational data and a second, different subset of the calculation nodes performing operations on relational data, the data flow model maintaining a format of the non-relational calculation nodes;

optimizing, by a calculation engine model optimizer, the first subset of calculation nodes included in the complete calculation scenario;
optimizing, by a relational database optimizer, the second subset of calculation nodes included in the complete calculation scenario, the relational database optimizer identifying the second subset of calculation nodes based at least on an indicator associated with each of the second subset of calculation nodes;
executing, by the database server, the operations defined by the first subset of calculation nodes and the second subset of calculation nodes of the complete calculation scenario optimized by both the calculation engine model optimizer and the relational database optimizer to result in a responsive data set; and
providing, by the database server to the application server, the data set.

18. The method of claim 17, wherein an input for each calculation node comprises one or more of: a physical index, a join index, an OLAP index, and another calculation node.

19. The method of claim 17, wherein each calculation node has at least one output table that is used to generate the data set.

20. A method comprising:
receiving, by a database server from a remote application server, a query that is associated with a first calculation scenario, a second calculation scenario, and a third calculation scenario that each define a data flow model that includes one or more calculation nodes arranged in a hierarchy, the first calculation scenario and second calculation scenario each comprising non-relational calculation nodes performing operations on non-relational data and the third calculation scenario comprising relational calculation nodes performing operations on relational data;
merging, by the database server, the first calculation scenario, the second calculation scenario, and the third calculation scenario into a complete calculation scenario, while maintaining a format of the non-relational calculation nodes, the complete calculation scenario comprising the non-relational calculation nodes and the relational calculation nodes;
optimizing, by a calculation engine model optimizer, the non-relational calculation nodes included in the complete calculation scenario;
optimizing, by a relational database optimizer, the relational calculation nodes included in the complete calculation scenario, the relational database optimizer identifying the relational calculation nodes based at least on an indicator associated with each of teh relational calculation nodes;
executing, by the database server, the operations defined by the relational calculation nodes and the non-relational calculation nodes of the complete calculation scenario to result in a responsive data set; and
providing, by the database server to the application server, the data set.

21. The method of claim 20, wherein an input for each calculation node comprises one or more of: a physical index, a join index, an OLAP index, and another calculation node.

* * * * *